A. J. COON.
CRANBERRY PICKING MACHINE.
APPLICATION FILED OCT. 25, 1917.
1,315,095.
Patented Sept. 2, 1919.
5 SHEETS—SHEET 1.
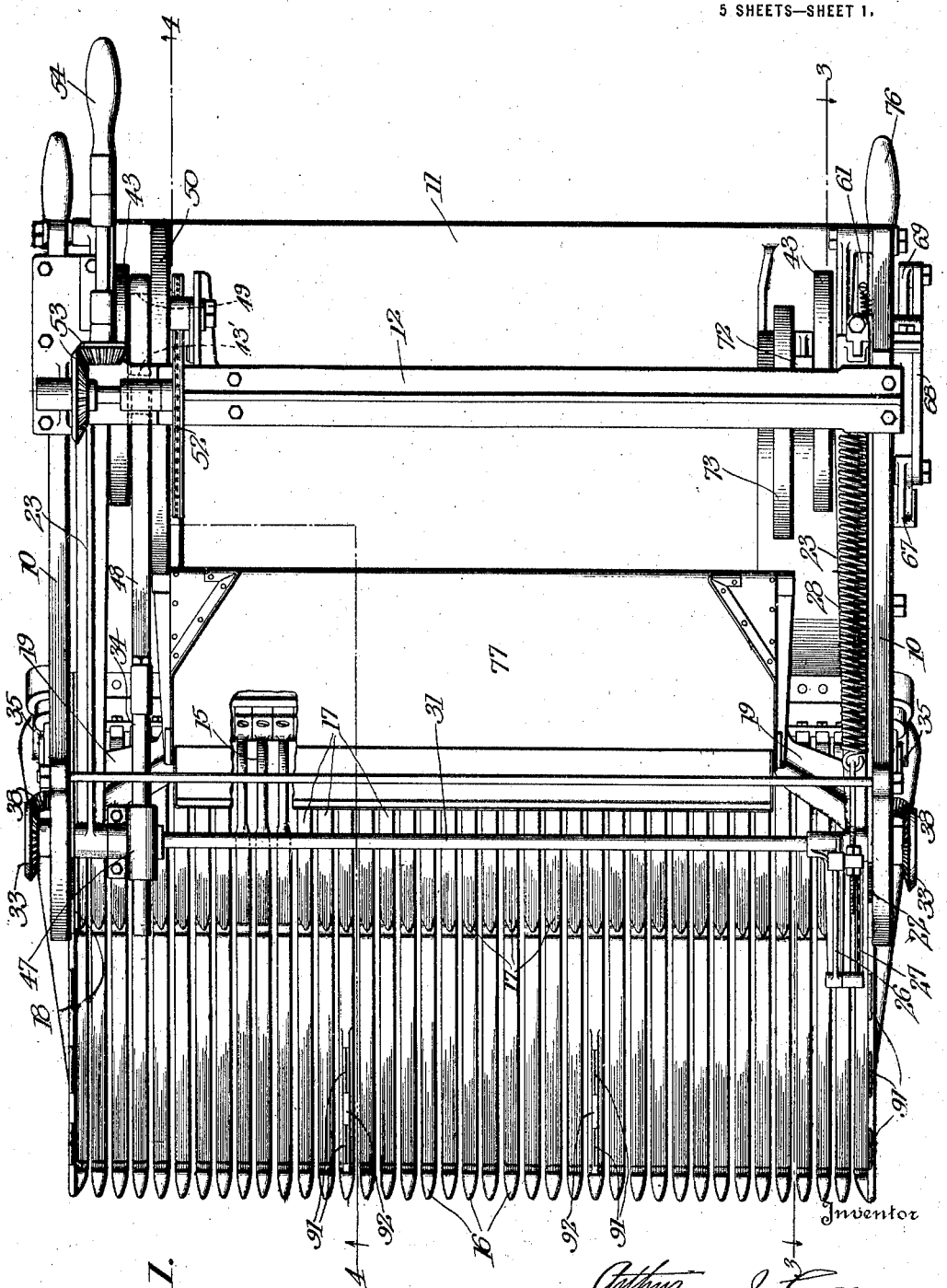

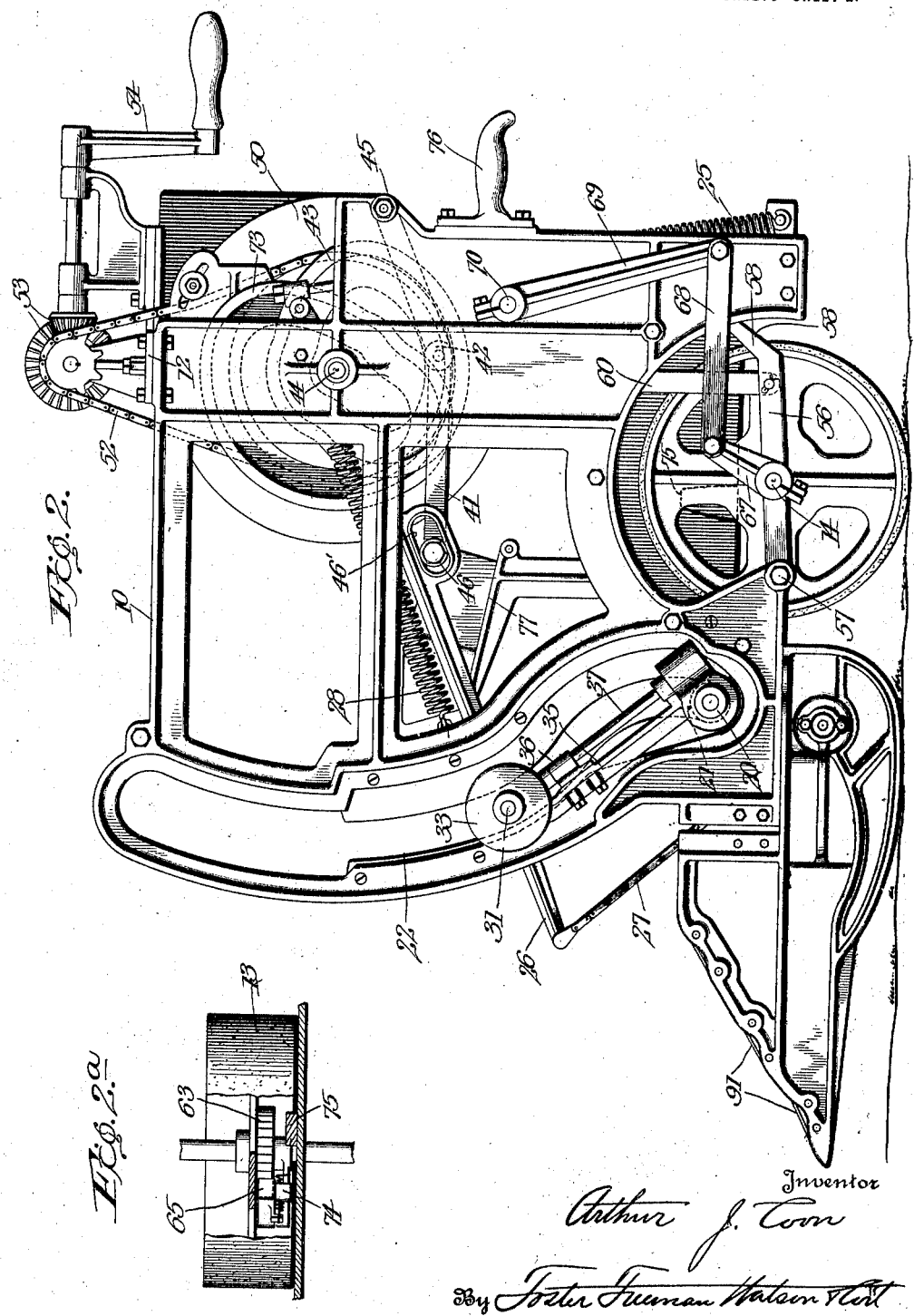

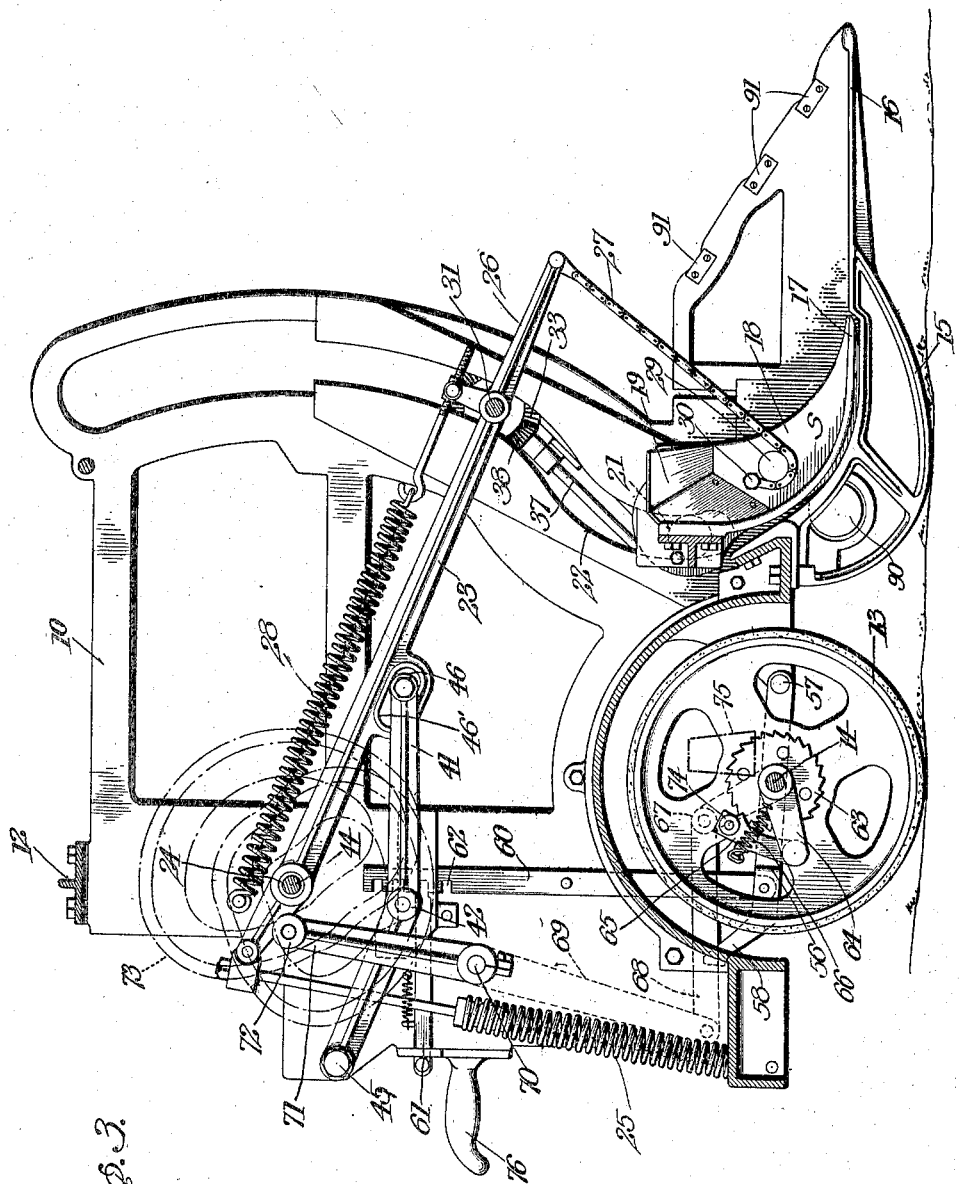

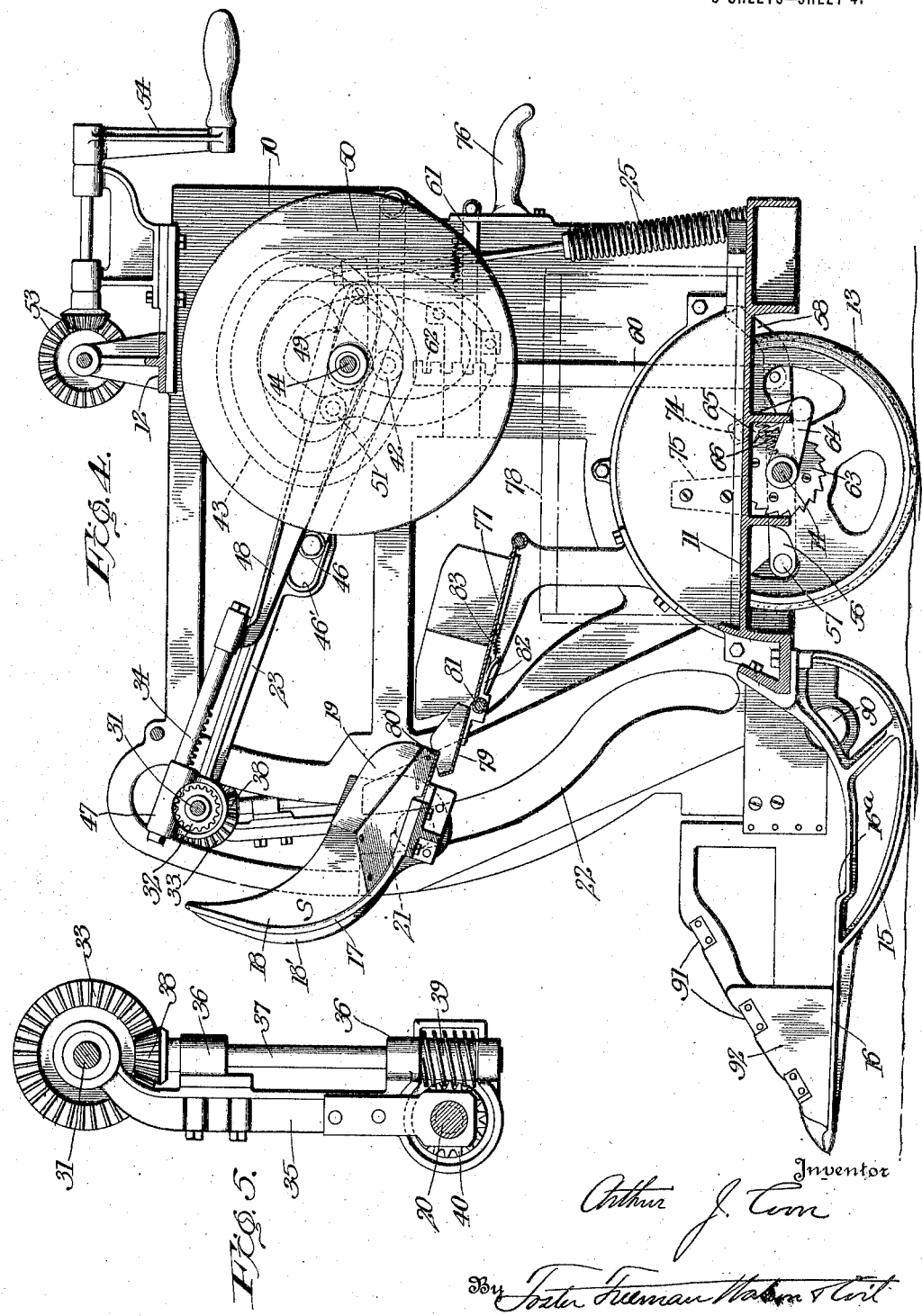

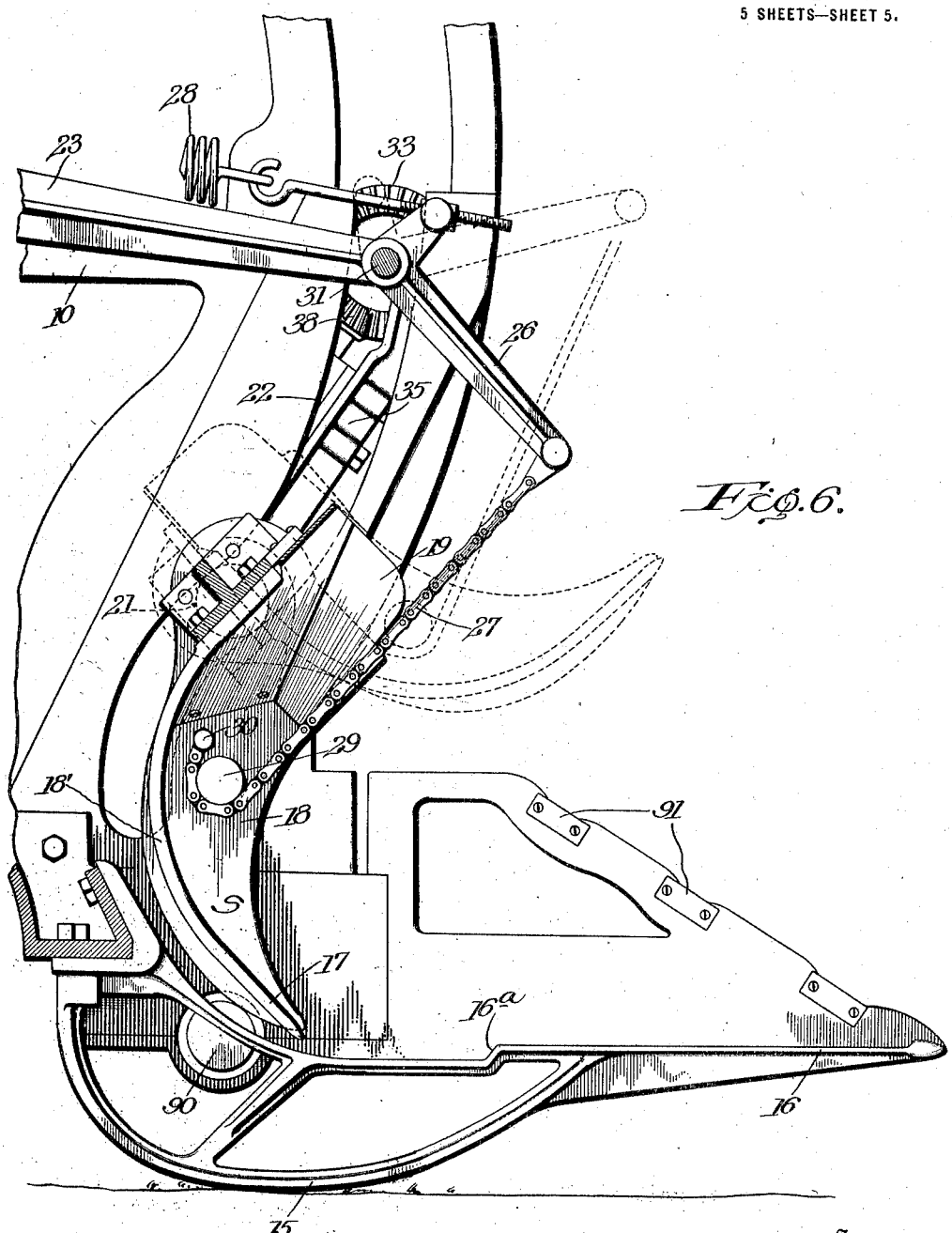

UNITED STATES PATENT OFFICE.

ARTHUR J. COON, OF PROVIDENCE, RHODE ISLAND.

CRANBERRY-PICKING MACHINE.

1,315,095. Specification of Letters Patent. Patented Sept. 2, 1919.

Application filed October 25, 1917. Serial No. 198,485.

*To all whom it may concern:*

Be it known that I, ARTHUR J. COON, a citizen of the United States, and residing at Providence, Providence county, State of Rhode Island, have invented certain new and useful Improvements in Cranberry-Picking Machines, of which the following is a specification.

The present invention relates to a berry harvesting machine and more particularly to such a machine adapted for picking cranberries.

One of the principal features of the invention consists in the use of a scoop for gathering the berries in combination with means for holding the vines down with the berries above the same, this latter means comprising a runner and comb.

Another feature consists in giving the scoop a motion which simulates the movement it would have if used manually to gather the berries.

Another feature consists in the provision of means for adjusting the height of the comb so that the machine can be used with vines of different heights.

Another feature consists in the novel mechanism for giving the scoop its motion.

Another feature consists in the intermittent forward feed of the whole machine in combination with the picking or scooping movement of the scoop timed to take place after a forward step of the machine.

Another feature consists in the provision of means to counterbalance the weight of the moving parts of the machine so that a minimum power is required to actuate the same.

Other features and objects will be apparent from the description taken in connection with the drawings, in which:—

Figure 1 is a plan view of a machine embodying my invention;

Fig. 2 is a left side view of the machine;

Fig. 2ª is a detail of the propelling mechanism;

Fig. 3 is a vertical section on the line 3—3 of Fig. 1 looking in the direction of the arrows;

Fig. 4 is a section on the line 4—4 of Fig. 1 looking in the direction of the arrows;

Fig. 5 is a detail of the gearing for operating the scoop; and

Fig. 6 is an enlargement of a portion of Fig. 3 showing the scoop in full lines approaching its lowest positions and in dotted lines as it travels upward.

The machine comprises a main frame for supporting the moving parts, the rear portion of the frame resting upon a pair of wheels and the forward portion resting upon runners. In front of the runners are tines which are adjusted as to height so that they will pass through the vines just below the berries and thus in a way separate the berries from the vines. The tines and runners are spaced so that the tips of the vines may pull through them while the berries resting upon them cannot pass through. Each of the tines is preferably the continuation of a runner. In the rear of the tines a scoop comes down periodically and when in its lowest or receiving position the machine is moved forward a limited distance and the berries resting upon the tines are thus delivered on to the scoop. The machine then stops its forward movement and the scoop travels upward, stripping the berries from the vines and delivering them into a suitable receptacle. The scoop then immediately moves down to its lowest or receiving position and the machine is then again moved forward, gathering another supply of berries in the scoop.

Referring to the drawings in detail the main frame consists of two side pieces 10, a connecting base plate 11, and a suitable brace or bar 12 connecting the tops of the said pieces. The machine is chiefly supported by two wheels 13 which are free upon an axle 14 and which are propelled to move the machine forward intermittently by means to be hereinafter described. The forward part of the machine rests upon runners 15 which are securely connected to the base plate 11. The runners have curved lower edges and are so shaped that they will travel over the vines without injuring them. Each of the runners, excepting the side runners, has a straight forward extension or tine 16, the upper surface of which is substantially horizontal and the forward end of which is pointed, as shown. The combined tines and runners are arranged parallel to each other and separated sufficiently to permit them to thread through the vines, but not sufficient to permit the cranberries to drop through. The machine is adjustable, as will be herein described, so that the tines may be raised or lowered, and in operation they are adjusted so that they will run just below the berries and above the mass of the vines.

The scoop S comprises a series of curved tines 17 which are adapted, when the scoop is in its lowest position, to lie directly over the respective runners 15 and in rear of the respective fixed tines 16, as shown in Figs. 1 and 3, the top surface of the runners being lower than the top surface of the tines, as shown at 16ª, so that the upper surface of the scoop tines is substantially flush with the upper surface of the comb tines or teeth 16. The scoop has end plates 18 and guides 19 to direct the berries rearwardly into a receptacle when the scoop is raised and tipped backward.

The scoop S is provided with trunnions 20 at its ends, carrying rollers 21 guided in the up and down movements of the scoop by a fixed camway or guideway 22 (Figs. 2, 3 and 4). In order to give the scoop a proper movement its trunnions must be rotated backward and forward as the scoop is raised and lowered, and these rocking and up and down movements are accomplished by the following mechanism. At each side of the machine is a lever 23 pivoted on sleeves 24. The forward or long arms of the levers carry the scoop while the short rear arms are connected to strong springs 25 which counterbalance the weight of the scoop and its operating mechanism. For the purpose of counterbalancing the scoop relative to its trunnion, the forward end of one of the levers 23 carries an elbow lever 26, one arm of which is connected with the corresponding end of the scoop by a chain 27, and the other arm of which is connected to a counterbalancing spring 28. The chain passes around a substantially circular projection 29 on the scoop and is anchored at 30 to the end of the scoop.

The forward ends of the levers 23 carry a shaft 31, which shaft carries near one end a spur gear or pinion 32 and at each end a beveled gear 33. The spur gear is turned backward and forward by a rack 34 in a manner to be presently described. The shaft 31 is connected by links 35 with the scoop trunnions 20. Mounted in brackets 36 on each of the links 35 is a shaft 37 having on its upper end a bevel pinion 38 meshing with the beveled gear 33 and having on its lower end a worm 39 meshing with a worm gear 40 on the corresponding scoop trunnion 20. This gearing gives to the scoop a rocking or oscillating movement on its trunnions as it is moved up and down.

The levers 23 which carry the scoop are moved by arms 41, which carry rollers 42 traveling in cam grooves in suitable cam plates 43 mounted on a shaft 44. The levers are pivoted to the main frame at 45 and each carries a roller 46 which engages a slot 46' in the corresponding lever 23. By means of the arrangement shown, I am enabled to move the levers 23 through a large arc by compact mechanism and by cams of very moderate size, and this is necessary in order to strip the berries properly and dump them into a box or receptacle resting on the base 11.

The rack 34 which rocks the shaft 31 travels up and down with the arms 23, one end of the rack sliding in a guide 47 which is mounted on shaft 31, and the other end of the rack being rigidly connected with an arm 48 which has a slot 49 sufficiently large to permit the hub 43' of one of the cams 43 (Fig. 1) to pass therethrough and the rear end of the arm therefore rests upon the hub of the cam. The arm is provided with a roller 51 which travels in a suitable groove in the cam wheel 50, as shown in dotted lines in Fig. 4. By means of the cams 43, the arms 23 are raised and lowered, and by means of the cam 50 the rack 34 is suitably reciprocated and the scoop rocked as it is raised and lowered, as will be presently explained.

The shaft 44, which may be termed the main shaft, is rotated as shown by means of a sprocket chain 52 driven by beveled gears 53 and a crank 54 (Fig. 2). It will be understood, however, that the machine may be driven by an electric, gasolene, or other motor.

The supporting wheels 13 run free upon an axle 14 which is carried in bearings in vertically adjustable arms 56, which arms are pivoted at 57 to the main frame. The free ends 58 of the arms are guided laterally but are free to move up and down to raise and lower the wheels with respect to the main frame for a purpose to be presently stated. The arms are held in position by vertical rods 60 (Figs. 3 and 4), which rods are adjustable to different positions by means of spring bolts 61 engaging notches 62 in the rods. The object of making the wheels vertically adjustable is to permit of adjusting vertically the forward ends of the fixed tines 16. It will be noted that when the rod 60 and the arms 56 are lowered, the rear part of the machine is relatively raised, tipping the upper part of the machine forward and lowering the free or forward ends of the tines 16. This adjustment permits of adapting the machine to vines of different kinds or vines upon which the cranberries grow at different heights from the ground. The fixed tines 16 may be termed collectively a comb, as their duty is to separate the tips of the vines and to hold any berries which may be accidentally detached and deliver them to the scoop.

The machine is intermittently moved forward a distance approximately equal to the length of the fixed tines 16 by the following means. Secured to each of the wheels 13 is a ratchet wheel 63 and adjacent each ratchet wheel is an arm 64 fixed on the axle 14 and carrying a pawl 65, which normally engages the ratchet wheel, being held in contact therewith by a spring 66. The axle 14 is rocked periodically by an arm 67, link 68, and arm 69 on a rock shaft 70. The shaft 70 is rocked by an arm 71 carrying a roller 72 which engages a groove in a cam 73 (Figs. 1, 2 and 3).

The cam 73 is so timed with the cams 50 and 43 that the propelling wheels 13 will move forward only while the scoop is in its lowest position as shown in full lines in Figs. 1 and 3. At other times the wheels 13 are not driven from the main shaft and during a certain portion of a cycle of operations, preferably while the scoop is in its dumping position, shown in Fig. 4, the pawl 65 is disconnected from the ratchet wheel 63 so that the machine may be moved backward or in any direction. The pawl is disconnected at its highest point by means of a roller 74 on its free end engaging a fixed projection or block 75 (Figs. 2ª and 3). The supporting wheels 13 are broad so that they will not injure the vines and the ratchet mechanism for propelling them is preferably located within the wheels, as shown in Fig. 2ª. At the rear of the machine are handles 76 by means of which the machine can be guided and controlled.

In Fig. 3 the scoop is shown in its lowest position and the machine is about to be moved forward to bring the scoop into a section of berries that have not been picked. During this movement, the length of which is determined by the capacity of the scoop, the vines are drawn down to some extent by the runners 15 and separated from the berries. The runners 15 are narrower than the tines 16, as shown in Fig. 1, permitting the vines to pass freely between them. After the movement of the machine forward the scoop begins to travel upward detaching the berries from the vines, its forward edge, or the forward ends of its tines rising to prevent the berries from dropping off, this being accomplished by rocking the scoop on its trunnion. The scoop is rocked on its trunnions by the gearing heretofore described, and is counterbalanced by the springs 28 so that the work done by the gearing is very light. In fact the entire power required to operate the machine is small, notwithstanding the machine is necessarily of considerable size. While the scoop is rising it is substantially in the tilted position shown in dotted lines in Fig. 6. As it reaches its uppermost level it assumes the position shown in Fig. 4, and as it moves downward it assumes the position shown in full lines in Fig. 6. The relative positions of the scoop in its up and down movement will be appreciated by comparison of its full line and dotted positions in Fig. 6, the trunnions of the scoop being at the same level for both positions.

As shown in Figs. 1 and 4, a chute 77 is provided to receive the berries from the scoop and convey them to the receptacle or box 78. At the forward or upper edge of the chute 77 there is a pivoted extension 79 which is free to move upward when engaged by the rear edge 80 of the scoop. The extension 79 is pivoted on a rod 81 and is normally held in the position shown in Fig. 4 by an arm 82 and spring 83. The scoop rises to the upper limit of its movement while substantially in the position shown in dotted lines in Fig. 6, when it is given a further rocking movement to dump the berries. Its rear edge engages the chute extension 79 which moves upward into a nearly vertical position and then drops back under the rear edge of the scoop while the latter is tipping to the position shown in Fig. 4. The parts are so coördinated that the berries in the scoop cannot escape excepting into the chute and the receptacle.

As shown the forward lateral edges of the machine are provided with the inclined knives 91. One or more of the teeth of the comb may also be provided with an upwardly extending plate 92, the upper edge of which is inclined downwardly to the point of the tooth. This upper edge carries one or more knives 91. If the comb or its teeth should pass under any of the stalks of the vines, then the knives 91 will cut the same thereby saving the vines from being uprooted.

From the foregoing description the operation of the machine is obvious. Starting with the scoop in its upper or dumping position, shown in Fig. 4, the cams 43 act to effect a bodily descending movement of the scoop. Simultaneously with the lowering movement the cam 50 operates to cause the scoop to rock on its trunnions, thereby lowering the forward edge or the tines of the scoop. This downward rocking continues until the scoop reaches the full line position shown in Fig. 6. If the downward rocking movement continued with the further lowering of the scoop, the tines would interfere with the comb. Hence, when the scoop reaches the said position, the cam 50 is of such shape that the rocking movement is reversed, so that, as the scoop continues in its downward movement it is turned in a counter clock-wise direction as viewed in Fig. 6 to have the tines of the scoop just clear the tops of the runners 15. These latter movements continue until the scoop assumes its lowest position, shown in Fig. 3, whereupon the scoop has a period of rest while the entire machine is advanced. In order to absolutely prevent the points of the scoop tines from striking the runners, in the movement just described, which might occur due to worn parts, each of the lower lateral edges of the scoop is formed with a curved track 18' which is shaped to bear on a roller 90 carried by the frame. The track comes in contact with the roller only during the latter portion of the downward movement of the scoop, and the scoop tines are thereby prevented from striking the runners.

With the scoop stationary in its lowest position, as shown in Fig. 3, the cam 73 actuates the ratchet device to turn the wheels and advance the machine a predetermined amount, preferably a distance substantially equal to the length of the tines 16 of the comb. Thus the scoop is pushed under the berries which have been separated from the mass of vines by the comb. At the end of the forward feed of the machine, the scoop is elevated and at the same time rotated on its trunnions to turn the tines in a counter clock-wise direction as viewed in Fig. 6, so that the berries will not fall out at the forward edge of the scoop. The position of the scoop after it has traveled upward a slight distance is shown in dotted lines in Fig. 6. In addition to the turning movement given to the scoop by the cam 50, during this elevating movement, the very raising of the scoop by the levers 23 gives an added turning movement. This will be apparent when it is observed that the levers 23 which carry the scoop turn about the shaft 44, and, of course, the scoop turns with the levers thereby further raising the scoop tines in the same direction that they are being raised by the cam 50. Moreover, the shape of the guideway 22 is such that it projects the scoop toward the front of the machine as the former is raised. This forward thrusting of the scoop, also effects a further turning of the same, raising the tines. As the raising of the tines of the scoop relative to its trunnions is augmented by the upward swinging of the levers 23 and the guideway 22, the cam 50 may be of relatively small diameter as compared to a cam to give the same angular motion without the aid of the levers and guideway. Of course, when the scoop is being lowered the reverse of the above described action occurs.

In its continued upward movement from the dotted line position of Fig. 6, the scoop receives substantially no further rotation, and its inner edge 80 trips by the hinged extension 79. Just before the scoop reaches the limit of its upward movement it is given a sharp turn or jerk to dislodge all the berries so that they will be dumped into the chute 77 which leads to the box 78. The scoop has a slight dwell at its upper position, after which the above described cycle of movements is repeated. It will be seen that the path of the scoop is similar to that of a manually operated scoop; that is, the toothed front of the scoop is thrust downward and under the berries, then the scoop is simultaneously thrust forward, elevated and turned to raise the front edge so that the berries will not escape. This motion which may best be termed, a scooping motion, is an important feature of the machine and contributes to its efficiency.

Having thus described the invention what is claimed as new and desired to be secured by Letters Patent is:—

1. A berry harvesting machine including in combination, a comb arranged to travel between the mass of vines and the berries, means for intermittently advancing said comb, a scoop, and means to actuate said scoop to gather the berries above the comb.

2. A berry harvesting machine including in combination, a comb arranged to travel between the mass of vines and the berries, means for intermittently advancing said comb, a scoop, and means to actuate said scoop after each advance of the comb to gather the berries above the comb.

3. A berry harvesting machine including in combination, a comb arranged to travel between the mass of vines and the berries, means for intermittently advancing said comb, a scoop, and means to give the scoop an up and down movement relatively to the comb, and simultaneously an oscillatory movement to gather the berries above the comb.

4. A berry harvesting machine including in combination, means to intermittently advance the machine, a scoop for gathering the berries, means for guiding said scoop for an up and down reciprocating movement, means for reciprocating the scoop, and means for simultaneously oscillating the scoop to give one complete oscillation for each complete reciprocation of the same.

5. A berry harvesting machine, including in combination, means to intermittently advance the machine, a scoop for gathering the berries, and cam means for bodily lowering the scoop and simultaneously turning the same to lower the front edge thereof, followed by a turning in the opposite direction to raise the front edge and a bodily elevation of the scoop and finally turning the same to dump the berries.

6. A berry harvesting machine, including in combination, means to intermittently advance the machine, a scoop for gathering the berries having trunnions, curved substantially vertical guideways for said trunnions, means for reciprocating the trunnions in said guideways, and means for oscillating the scoop about said trunnions once for each reciprocation of the trunnions.

7. A berry harvesting machine, including in combination, a main shaft, a cam on said shaft, means actuated by said cam to intermittently advance the machine, a scoop, and other cam means on said shaft to actuate the scoop to gather the berries.

8. A berry picking machine, including in combination, a frame, a main shaft carried by the frame, means actuated by said shaft to intermittently advance the machine, a lever, a scoop pivotally carried at the front end of said lever, means actuated by said shaft to rock the lever and thereby raise and lower the scoop, and means also actuated by said shaft to oscillate said scoop in timed relation to the raising and lowering thereof to thereby give the scoop a scooping motion to gather the berries.

9. A berry picking machine, including in combination, a frame, a main shaft carried by the frame, means actuated by said shaft to intermittently advance the machine, a lever, a link pivoted to the front end of the lever, a scoop pivoted to the lower end of said link, and means actuated by said shaft to rock the lever and oscillate the scoop about its pivot on the link in timed relation to the rocking of the lever, to thereby give the scoop a scooping motion to gather the berries.

10. A berry picking machine, including in combination, a frame, a main shaft carried by the frame, means actuated by said shaft to intermittently advance the machine, a lever, a link pivoted to the front end of the lever, a scoop pivoted to the lower end of said link, means actuated by said shaft to rock the lever and oscillate the scoop about its pivot on the link in timed relation to the rocking of the lever, means to counterbalance the lever and parts carried thereby, and means to counterbalance the scoop.

11. A berry picking machine, including in combination, a frame, a main shaft carried by the frame, means actuated by said shaft to intermittently advance the machine, a lever, a link pivoted to the front end of the lever, a scoop trunnioned in the lower end of the link, a curved substantially vertical guideway for said trunnion, means actuated by said shaft to rock the lever to reciprocate the trunnion in the guideway, and independent means actuated by said shaft for oscillating the scoop about its trunnion in timed relation to the reciprocation thereof.

12. A berry picking machine including in combination, a frame, a comb at the front thereof, runners directly below and in the same vertical plane with the teeth or tines of the comb, a scoop, means to move said scoop to gather the berries above the comb, and means to advance the machine step by step.

13. A berry picking machine including in combination, a frame, a comb at the front thereof, runners directly below and in the same vertical plane with the teeth or tines of the comb, means to gather the berries above the comb, and means to advance the machine step by step.

14. A berry picking machine including in combination, a frame, a comb at the front thereof, runners directly below and in the same vertical plane with the teeth or tines of the comb, wheels in rear of the runners, means to intermittently actuate said wheels to advance the machine step by step, and means for scooping up the berries above the comb after a forward step.

15. A berry picking machine including in combination, a frame, a comb at the front thereof at an elevation to enter between the mass of vines and the berries, a scoop having teeth or tines in the same vertical planes as the teeth or tines of the comb, means to advance the machine step by step, and means to move the scoop to gather the berries above the comb after a forward step.

16. A berry harvesting machine, including in combination, a frame, a comb at the front thereof at an elevation to enter between the mass of vines and the berries, means to adjust the elevation of the comb, a scoop, and means to actuate the scoop to gather the berries above the comb.

17. A berry harvesting machine, including in combination, a frame, a comb at the front thereof at an elevation to enter between the mass of vines and the berries, runners under the comb, supporting wheels in rear of the comb, and means for adjusting the elevation of the frame relative to the axis of the wheels.

18. A berry harvesting machine including ing in combination, a frame, a comb at the front thereof at an elevation to enter between the mass of vines and the berries, means for supporting the forward end of the frame, means for supporting the rear end including a pair of wheels, and means for adjusting the elevation of the frame relative to the axis of the wheels.

In testimony whereof I affix my signature.

ARTHUR J. COON.

Copies of this patent may be obtained for five cents each, by addressing the "Commissioner of Patents, Washington, D. C."